H. B. McKENZIE.
AUTOMOBILE STEERING GEAR.
APPLICATION FILED NOV. 11, 1916.
1,243,317.
Patented Oct. 16, 1917.
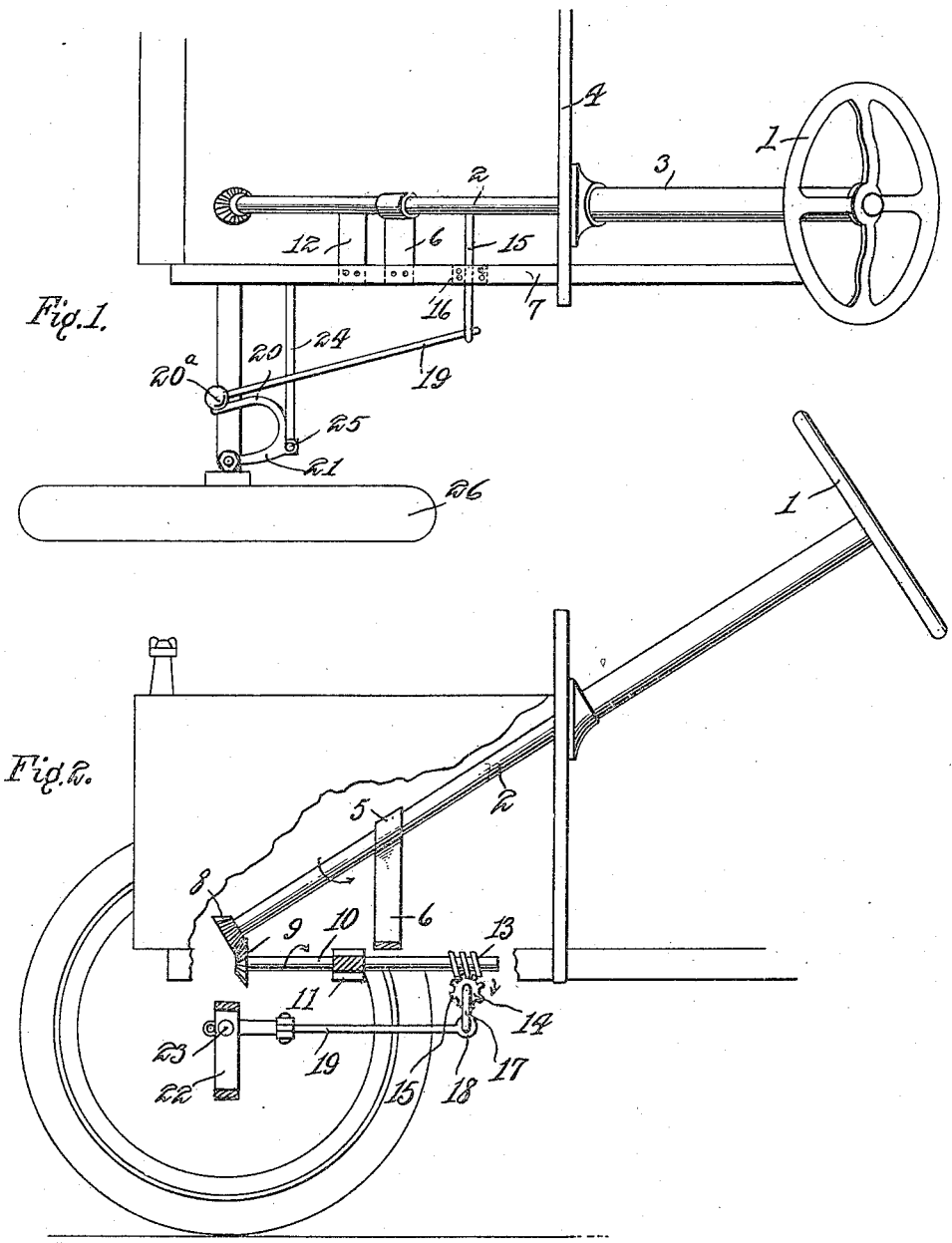
INVENTOR
Hugh B. McKenzie.

UNITED STATES PATENT OFFICE.

HUGH B. McKENZIE, OF BEECHER CITY, ILLINOIS.

AUTOMOBILE STEERING-GEAR.

1,243,317.   Specification of Letters Patent.   Patented Oct. 16, 1917.

Application filed November 11, 1916. Serial No. 130,870.

*To all whom it may concern:*

Be it known that I, HUGH B. McKENZIE, a citizen of the United States, residing at Beecher City, in the county of Effingham and State of Illinois, have invented certain new and useful Improvements in Automobile Steering-Gears, of which the following is a specification.

This invention relates to automobile steering gears, and more particularly to a gear in which the steering apparatus is secured in adjustment by worm gear means.

One of the main objects of the invention is to provide a steering gear of the character stated of simple construction and operation which may be easily applied to an automobile of standard construction. A further object is to provide simple and efficient means for operating the steering gear from the steering wheel. Further objects will appear from the detailed description.

In the drawings:

Figure 1 is a top plan view of a steering gear constructed in accordance with the invention as applied, Fig. 2 is a side view of the same.

A steering wheel 1 is operatively connected to the steering post 2 which is rotatably supported in the steering standard 3 secured through the dash 4, in the usual manner. The steering post 2 is supported, intermediate its ends, by a bearing sleeve 5 carried by an angle bracket 6 which is secured to the side bar 7 of the automobile frame or chassis. A bevel gear 8 is secured on the lower end of the steering post 2. This gear meshes with a beveled gear 9 keyed on the outer end of a shaft 10 which is rotatably mounted in vertical alinement with the steering post 2 in a bearing sleeve 11 carried by an arm 12 secured to the side bar 7 in advance of the bracket 6. By this construction, when the steering wheel 1 is rotated rotation will be imparted to the shaft 10. Shaft 10 is provided, on its inner end portion, with a worm 13. This worm meshes with a worm gear 14 which is secured on the inner end of a transverse steering shaft 15 rotatably mounted in a bearing block 16 secured to the side frame bar 7. This shaft 15 extends laterally of the automobile frame and is turned downward at right angles to provide a vertical arm 17. This arm is turned inward at right angles and is pivotally secured through an eye 18 formed integral with an operating rod 19. The forward end of rod 19 is secured by a ball-and-socket joint to the inner arm 20 of a steering fork 21, as at 20ª. The other arm of fork 21 is secured to the pivotally mounted spindle post 22 which carries the wheel spindle 23. A transversely extending steering rod 24 is pivotally secured to the inner end of the outer arm of the steering fork 21, as at 25, and has its other end similarly secured to the steering fork of the other wheel spindle. A wheel 26 is rotatably secured on the spindle 23 in the usual manner.

When the steering wheel is rotated rotation will be imparted to the shaft 10 and, by means of the worm 13 and gear 14, longitudinal movement will be imparted to the operating rod 19. This movement of the rod will serve to swing the spindle post 22 about its pivotal axis in either direction, depending on the direction of rotation of the steering wheel. The connections between the steering post and the steering fork 21 are such that, by turning the steering wheel 1 in the direction in which it is desired to turn the machine, the wheels 26 of the automobile will be swung in that direction thus avoiding any confusion on the part of the driver.

The gears 8 and 9 and shaft 10 provide simple and efficient means for imparting rotation to the worm 13. The worm 13 serves to lock the worm gearing 14, and consequently the steering fork 21 in adjusted position and effectually prevents any play or jerking of the same, thus insuring smoothness and accuracy of operation of the steering gear.

There may be slight changes made in the construction and arrangement of the different parts of my invention without departing from the field and scope of the same, and I intend to include all such changes, as fall within the scope of the appended claim, in this application in which a preferred form only of my invention is disclosed.

What I claim is:

In an automobile steering gear, the combination of a steering post, a gear secured on said post, a rotatably mounted shaft in vertical alinement with the steering post, a gear secured on said shaft and enmeshed with the gear secured on the steering post, a worm carried by the said shaft, a rotatably mounted transversely extending steering shaft, a worm gear secured on the steering shaft and enmeshed with said worm, the said steering shaft having its outer portion bent downward at right angles, an operating rod pivotally secured at its inner end to the lower outer end of the steering shaft, a pivotally mounted spindle post, a steering fork having the forward end of its outer arm secured to the said spindle post and the forward end of its inner arm connected by ball-and-socket connections to the outer end of the operating rod, and a steering rod pivotally secured at its end to the said steering fork.

In testimony whereof I affix my signature in presence of two witnesses.

HUGH B. McKENZIE.

Witnesses:
L. W. McKenzie,
L. F. Burns.

Copies of this patent may be obtained for five cents each, by addressing the "Commissioner of Patents, Washington, D. C."